United States Patent
Moler et al.

(10) Patent No.: US 7,126,259 B2
(45) Date of Patent: Oct. 24, 2006

(54) INTEGRAL THERMAL COMPENSATION FOR AN ELECTRO-MECHANICAL ACTUATOR

(75) Inventors: Jeffery B. Moler, Sarasota, FL (US); Aaron Dickey, Sarasota, FL (US); Keith Thornhill, Sarasota, FL (US)

(73) Assignee: Viking Technologies, L.C., Sarasota, FL (US)

( * ) Notice: Subject to any disclaimer, the term of this patent is extended or adjusted under 35 U.S.C. 154(b) by 0 days.

(21) Appl. No.: 10/993,118

(22) Filed: Nov. 19, 2004

(65) Prior Publication Data

US 2005/0146248 A1   Jul. 7, 2005

Related U.S. Application Data

(60) Provisional application No. 60/523,808, filed on Nov. 20, 2003.

(51) Int. Cl.
*H01L 41/08* (2006.01)
*H02N 2/00* (2006.01)

(52) U.S. Cl. .................................... 310/346; 310/328
(58) Field of Classification Search ................ 310/346, 310/353, 370, 367, 328
See application file for complete search history.

(56) References Cited

U.S. PATENT DOCUMENTS

| | | | |
|---|---|---|---|
| 4,219,755 A | 8/1980 | O'Neill et al. | |
| 4,284,263 A | 8/1981 | Newcomb | |
| 4,431,873 A | 2/1984 | Dunn et al. ................. | 179/110 |
| 4,570,095 A | 2/1986 | Uchikawa | |
| 4,622,484 A | 11/1986 | Okihara et al. | |
| 4,672,257 A | 6/1987 | Oota et al. | |
| 4,675,568 A | 6/1987 | Uchikawa et al. | |
| 4,686,338 A | 8/1987 | Kashiwagi et al. | |
| 4,736,131 A | 4/1988 | Fujimoto | |

(Continued)

FOREIGN PATENT DOCUMENTS

DE   101 59 748   6/2003

(Continued)

*Primary Examiner*—Thomas M. Dougherty
(74) *Attorney, Agent, or Firm*—Young & Basile, P.C.

(57) ABSTRACT

The present invention includes a method of compensating for differences in the rate of thermal expansion in one or more elements of an electro-mechanical actuator. The electro-mechanical actuator can include one or more elements such as a piezoelectric ceramic multilayer actuator (CMA) and a mechanism to amplify the motion of the CMA. A difference in the rate of thermal expansion or coefficient of thermal expansion, CTE, between the materials in the CMA and the amplifying mechanism can cause the two components to vary in size at differing rates as the ambient temperature varies. Since the amplifying mechanism provides substantial amplification of the motion of the CMA, the relative variation in size of the components due to temperature can be translated by the amplifying mechanism as motion of the CMA. This can result in substantial motion of the amplifying mechanism. Replacing a mechanical element in the amplifying mechanism with an element having a different value for the CTE substantially reduces the difference in CTE of the materials, thereby reducing the thermally induced motion of the amplifying mechanism. Further, the material used and the means of interconnecting the replacement element in the amplification device for thermal compensation can maintain high rigidity of the CMA support structure, since the support structure transmits the motion and force of the CMA to the amplifying mechanism as well as applying a compressive preload to the CMA. Further, a high level of compressive preload force can be used as an additional part of the overall design process to adjust the degree of thermal compensation required.

48 Claims, 4 Drawing Sheets

U.S. PATENT DOCUMENTS

| | | |
|---|---|---|
| 4,886,382 A | 12/1989 | Oota et al. |
| 4,979,275 A | 12/1990 | Sakaida et al. |
| 5,028,834 A | 7/1991 | Sakaida et al. |
| 5,059,850 A | 10/1991 | Yoshimura et al. |
| 5,089,739 A | 2/1992 | Takahashi et al. |
| 5,095,725 A | 3/1992 | Wada et al. |
| 5,100,100 A | 3/1992 | Benson et al. |
| 5,205,147 A | 4/1993 | Wada et al. |
| 5,250,868 A | 10/1993 | Shirasu |
| 5,354,032 A | 10/1994 | Sims et al. |
| 5,388,751 A | 2/1995 | Harada et al. |
| 5,438,206 A | 8/1995 | Yokoyama et al. |
| 5,593,134 A | 1/1997 | Steber et al. |
| 5,630,440 A | 5/1997 | Knutson et al. |
| 5,816,285 A | 10/1998 | Ohmi et al. |
| 5,819,710 A | 10/1998 | Huber |
| 6,085,990 A | 7/2000 | Augustin |
| 6,148,842 A | 11/2000 | Kappel et al. |
| 6,274,967 B1 | 8/2001 | Zumstrull et al. |
| 6,294,859 B1 * | 9/2001 | Jaenker ............. 310/328 |
| 6,313,568 B1 | 11/2001 | Sullivan et al. |
| 6,321,022 B1 | 11/2001 | DeBoynton |
| 6,400,062 B1 | 6/2002 | Gallmeyer et al. |
| 6,422,482 B1 | 7/2002 | Stier et al. |
| 6,626,373 B1 | 9/2003 | Ruehle et al. |
| 6,633,108 B1 | 10/2003 | Boecking |
| 6,759,790 B1 * | 7/2004 | Bugel et al. ............. 310/328 |
| 6,776,390 B1 | 8/2004 | Boecking |
| 6,870,305 B1 | 3/2005 | Moler |
| 2002/0113524 A1 | 8/2002 | Hays et al. |
| 2003/0006300 A1 | 1/2003 | Meretti et al. |
| 2004/0035106 A1 | 2/2004 | Moler et al. |
| 2004/0045148 A1 | 3/2004 | Moler |
| 2004/0061003 A1 | 4/2004 | Bocking |
| 2004/0084998 A1 | 5/2004 | Boecking |
| 2004/0125472 A1 | 7/2004 | Belt ............. 359/847 |
| 2004/0151438 A1 | 8/2004 | Ferguson |
| 2004/0206409 A1 | 10/2004 | Yano et al. |

FOREIGN PATENT DOCUMENTS

| | | |
|---|---|---|
| DE | 102 19 149 | 11/2004 |
| JP | 60-180026 | 9/1985 |
| JP | 60-237868 | * 11/1985 |
| JP | 1-85175 | * 7/1989 |
| JP | 04-179283 | * 6/1992 |

* cited by examiner

INTEGRAL THERMAL COMPENSATION FOR AN ELECTRO-MECHANICAL ACTUATOR

CROSS-REFERENCE TO RELATED APPLICATIONS

This application claims the benefit of provisional patent application No. 60/523,808 filed on Nov. 20, 2003, which is incorporated by reference herein.

FIELD OF THE INVENTION

The present invention relates to a temperature compensating apparatus and method for a mechanically leveraged smart material actuator.

BACKGROUND

Electro-mechanical actuators are a well-known means to convert electrical energy into mechanical force and motion. Historically this has been accomplished via electromagnetic devices such as solenoids. A method receiving increasing application recently involves the use of various smart materials such as magnetostrictive or piezoelectric devices. In the case of piezoelectric devices, Ceramic Multilayer Actuators (CMA) are particularly attractive due to their ability to generate extremely high forces, potentially thousands of Newtons. On the other hand, such CMAs will generate such force over a very limited range of motion, on the order of 0.15% of the length of the CMA. In the case of a CMA 40 mm in length, free deflection, expansion of the CMA without a counteracting force applied to the stack, would be approximately 0.06 mm. The combination of such a high force with such a limited movement has been one of the impediments to broad use of CMAs in typical industrial and commercial applications. For example, a valve may require a total stroke of approximately 1 mm and a force of approximately 10N. To achieve the force and stroke for such a valve and a variety of alternate applications, various mechanisms have been designed to convert the excess force into increased motion. Examples of such mechanisms are described in U.S. Pat. No. 4,736,131 to Fujimoto, U.S. Pat. No. 4,570,095 to Utchikawa, and U.S. Pat. No. 6,759,790 to Bugel et al.

Each mechanism converts a portion of the force of the CMA to additional stroke at the working end of the stroke amplification mechanism. The actual structural magnitude of this amplification is dependent on the specific configuration. A key objective of this type of approach to amplifying the stroke of a CMA is to maximize the efficiency of the transfer of force into stroke. As an example, the mechanism described by Utchikawa in U.S. Pat. No. 4,570,095 teaches converting only 60% of the available deflection. A critical element in achieving higher transfer efficiency is the rigidity or stiffness of the support structure surrounding the CMA. The invention described by Bugel et al in U.S. Pat. No. 6,759,790, illustrates a design that can achieve such a high rigidity. It is therefore important to carry this support structure stiffness into designs incorporating other features such as a thermal compensation mechanism.

In general, stroke amplifying mechanisms are constructed of metallic materials, for example steel. Each such material has an identifiable and generally well known Coefficient of Thermal Expansion (CTE). This CTE is a measure of the rate and direction of expansion of a material with a change in temperature of that material. The CMA used to drive the amplifying mechanism also has a CTE. In general, the CTE of the CMAs differ from those of the materials typically used in such amplifying mechanisms. For example, a 17/4 grade of stainless steel that might be used in the support structure and amplifying mechanism of the current invention, as illustrated in FIG. 1, has a typical CTE of around $11 \times 10^{-6}$ per degree Celsius. Similarly, it is generally recognized that the CMA has a slightly negative CTE of around approximately $-1 \times 10^{-6}$ to approximately $-3 \times 10^{-6}$ per degree Celsius. This difference in CTE between the steel mechanical structure and the CMA will result in a change in the force applied on the amplifying mechanism during a change in ambient temperature conditions. This force will effectively be added to the force applied by the CMA to the amplifying mechanism and will, in turn, contribute to the stroke and force output of the amplifying mechanism. Such a thermal effect can result in an improper operation of a device, such as the previously mentioned valve, using such an actuating mechanism. If, for example, the difference in CTE is such that it results in a reduction in the force applied to the stroke amplifying mechanism, the amount of stroke and associated force will be less than the expected amount. This reduction in stroke or force could cause an associated valve to demonstrate a flow rate that is less than nominal or inadequate sealing force resulting in leaking.

Various methods have been attempted to compensate for, or eliminate, this difference in CTE. For example, Salim in "Kleinste Objecte im Griff" (F&M September 1996) describes a stroke amplifying mechanism that is constructed of silicon. This approach does minimize the difference in CTE of the CMA and the stroke amplifying mechanism. However, it does so with a severe impact to multiple characteristics, for example structural reliability, production complexity and cost. These will, in turn, limit the potential physical size and work capability. Therefore, also limiting the applicability of such an approach.

Wada et al. in U.S. Pat. No. 5,205,147 describe a method of minimizing the difference in CTE between a CMA and an associated housing. The invention described does not include amplification of the free deflection of the CMA. In contrast, the reference teaches "stacking" the CMAs to obtain sufficient stroke and then having an equivalent opposing mechanism to effectively double the working stroke of the assembly. Further, the construction of the housing enclosing the piezo is composed of multiple pieces that are bolted or welded together.

Others teach thermal compensation using various electronic control methods, for example U.S. Pat. No. 6,400,062. In general, this approach adds substantial complexity and cost to the actuation system.

Generally it is accepted that when a piezoelectric CMA is used for electro mechanical actuation a compressive preload will be applied. This preload force is typically applied as a means of ensuring that the CMA is maintained mostly in compression during operation. This, in turn, usually increases the dynamic lifetime of the piezoelectric CMA.

SUMMARY

The present invention is of a design and stiffness that allows significantly higher levels of preload to be applied to the CMA than is typically in the art. In applying high levels of preload it was found with the present invention that the level of compressive preload changes the extent or degree of the thermal expansion mismatch between the piezoelectric CMA and the substantially metal amplification mechanism. This effect has the added benefit of making it possible to adjust the amount of thermal compensation required as a function of preload applied. Furthermore this effect can be used as part of the overall process for designing the mechanism of the present invention for tuning the thermal compensation required in relation to the mechanism performance.

The present invention can provide a mechanism capable of amplifying the stroke of a CMA while simultaneously providing sufficient output force to be useful in a variety of typical, "real world" applications; and/or provide a stroke amplifying mechanism that transforms "excess" force to usable stroke with a high level of efficiency through the use of an extremely stiff support structure; and/or provide mechanical thermal compensation for the different values of CTE of a CMA and the support structure of an electro mechanical actuator so that such compensation; is mechanically simple and reliable, effectively integral to the mechanical support structure such that the structure maintains a high level of mechanical rigidity and, therefore, enables highly efficient work transfer; is effective across a broad range of temperatures typically experienced in industrial type applications, for example −20° C. to 60° C.; does not significantly affect the output of the amplifier, such as by causing increased curvilinear motion; can be adapted to operate at a range of preload forces from 0 psi to 10000 psi; does not substantially affect the size, weight or other physical characteristics of the actuator; can be easily integrated into the actuator during production; is based on and accounts for the effect of preload on the CMA CTE and/or is capable of being used as an element of the components providing preload, not merely sustaining it; and/or present a method for designing a thermal compensation element such that the length of the thermal compensating element is calculated as a function of the actuator design, the respective CTE values of the CMA and the materials to be used for thermal compensation and the amount of compressive preload applied to the CMA.

The basic approach of the present invention is contrary to the wide held industry and academic belief that there is a single CTE for the piezoelectric actuator stack in a short circuited condition. According to the present invention, the CTE of the CMA changes as a function of the amount of preload applied to the stack. The actuator according to the present invention operates at relatively high preloads when compared to other mechanically amplified actuators. If the present invention used the relatively high level of preload combined with the "known" stack CTE, the thermal compensation provided would be inaccurate.

The concept of changing CTE as a function of preload can tie several related features of the present invention with respect to one another. First, the present invention operates at high preload to maximize work performance. As a general statement, the preload typically used is higher, in certain cases many times much higher, than used in prior art. Second, the present invention ensures that the "central portion" of the actuator is "rigid". As is known, the actual motion of the stack itself is on the order of "a few" ten thousandths of an inch (depending on a variety of factors). Since this motion is so small, any "stretch" in this area can be wasted motion that is not transferred to the "anvil" and, in turn, amplified at the arms. Therefore, the present invention maintains a high level of structural rigidity while incorporating the mechanical thermal compensating element, or, as presently embodied, an Invar material element forming at least one of an actuator seat and/or a portion of the rigid support structure. Any decrease in rigidity in the central support structure portion of the actuator results in diminished movement at the arms.

The present invention provides the ability to compensate for difference in values of the material CTE of the metal of the central portion of the amplifier versus the ceramic multilayer actuator. As temperature changes, the length of the "central metal support structure portion" and the ceramic multilayer actuator stack change at differing rates. Other dimensions change also, but the relevant dimension is oriented along the longitudinal length of the actuator stack. The different rates of CTE can result in reduced preload and, therefore, reduced stroke. The thermal compensation according to the present invention brings the CTE of the metal and the stack into balance. If this compensation is not designed based on the "correct" CTE, the amount of compensation provided will not be optimal. The CTE of the stack according to the present invention can change as a function of preload. With minimal levels of preload force applied to the multilayer ceramic actuator stack, this may not have a significant impact. However, since the present invention envisions a relatively high level of preload force applied to the ceramic multilayer actuator stack and the efficient conversion of stack movement to actuator movement is desired in the present invention, the thermal compensation can be significant in the present invention to ensure proper operation of the mechanism across the desired range of operating temperatures typically required for industrial applications. Therefore, it is desirable for the present invention to determine a design of the compensation structure and composition based on the CTE at the "nominal" (unactuated) preload.

A method is disclosed for determining the necessary CTE compensation for a mechanism including a piezoelectric or ceramic multilayer actuator stack and a mechanism for transforming the work output of the stack, typically made from steel, for amplifying or otherwise transferring or transforming the work output by the stack. The method according to the present invention provides appropriate thermal compensation based on the amount of preload on the stack.

Note that the phenomenon/method according to the present invention appears to be very general in nature. It can apply to any use where a piezoelectric or ceramic multilayer actuator stack is preloaded within a mechanism having a CTE different from the CTE of the stack in a wide variety of embodiments including those which are geometrically or operationally different from that illustrated in the accompanying drawings of an exemplary mechanism according to the present invention. It is desirable in the method according to the present invention to minimizes, or result in negligible change to, structural rigidity of the assembly according to the present invention, thus ensuring maximal work transfer efficiency. It is desirable in the method according to the present invention to provide a simple, easily assembled, reliable, cost effective mechanism.

The present invention provides an apparatus and method for amplifying movement of an electrically activated ceramic based actuator with a structural assembly capable of providing consistent performance characteristics while operating across a desired range of temperature conditions including a support having a first rigid non-flexing portion with a first coefficient of thermal expansion value and a second rigid non-flexing portion with a second coefficient of thermal expansion value different from the first coefficient of thermal expansion value, the support including at least one pivotable arm portion extending from one of the rigid portions, and a force transfer member operably positionable for driving the at least one pivotable arm portion in rotational movement, and an electrically activated actuator having a third coefficient of thermal expansion value different than the first and second coefficients of thermal expansion values, the actuator operably engagable between one of the rigid portions and the force transfer member to drive the force transfer member relative to the rigid portions causing the at least one pivotable arm portion to pivot in response to an electrical activation of the actuator, wherein the different coefficient of thermal expansion values of the rigid portions in combination with a structural configuration of the support substantially compensate for the third coefficient of thermal expansion value of the actuator over a desired operating range of temperature conditions. In general, the desirable material characteristics for a compensating material are high mechanical stiffness, Young's Modulus, high mechanical yield stress and a CTE value different to the first rigid non-flexing portion and different to that of the CMA such that it can compensate for thermal excursions over the desired range. The present invention can use a number of commercially available materials for the second rigid non-flexing compensating portion of the mechanism, for example INVAR, KOVAR, NILVAR etc. Further, it may be possible to use other suitable materials, for example a metal matrix composite material, or similar, that has an appropriate value of CTE. By way of example and not limitation, a typical electrically activated ceramic based actuator or ceramic multilayer actuator has a CTE of approximately $-1 \times 10^{-6}$ to approximately $-3 \times 10^{-6}$ per degree Celsius. When such a grade of stainless steel is used to enclose the actuator in the rigid support structure then any temperature fluctuations can result in a differential change in length of this support structure section in relation to the actuator. In turn, this can produce a movement in the force transfer and amplifying mechanism such that the active arms can change position purely due to a thermal excursion. To compensate for this change a third material, for example and INVAR grade 36, can be added according to the present invention as part of the rigid support structure such that its CTE is different than the other materials already described. Finite Element Analysis (FEA) can be used along with a basic linear calculation to decide on the amount of stainless steel material to be replaced with this third material so as to match the motion of the support structure to that of the ceramic based actuator such that there is no change in position observed at the active arms due to thermal excursions within a temperature range.

According to the present invention for the determination of the size of the compensating rigid portion, only the second rigid portion and the force transfer member are use in the calculations. The rest of the structure, i.e. hinges, arms, are not required to be used in the determination of an appropriate level of compensation. The present invention envisions the possibility of having more than two rigid portions, i.e. the "base" of the rigid area could be a material different from the other two rigid materials (or the same as "the first"). For example, if the first rigid portion is defined as integral to the force transfer member, hinges, etc., the second rigid portion can be composed of thermally compensating material and can be attached to the first rigid portion parallel to a longitudinal axis of the actuator. A third rigid portion can connect to the second at the end of the second rigid portion opposite from the end attached to the first rigid portion and perpendicular to the longitudinal axis of the actuator. According to the present invention, the coefficient of thermal expansion of one of the rigid nonflexing portions substantially compensates for the difference in the value of the coefficient of thermal expansion of the second rigid nonflexing portion and the coefficient of thermal expansion of the electrically activated ceramic based actuator over a desired operating range of temperatures.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The present invention can include a force amplifying mechanism having one or more elements. These elements can be based on materials chosen to provide an effective combined value of CTE that substantially minimizes the difference of individual values of CTE between the materials used for the piezoelectric CMA and the amplifying mechanism. Further, the thermal compensating elements can be integral to the operation of the amplifying mechanism. These elements provide a very rigid structure so as to allow applying the necessary compression preload force to the piezoelectric CMA and so as not to lose any of the extension provided by the CMA. As already stated, the amount of deflection provided by a CMA is very small, typically 0.10% to 0.15% of its total length, during operation. Any flexure in the support structure would be a direct reduction in this output from the CMA and result in a significant lowering of the efficiency of operation of the invention. In the case of a multiple element configuration, the elements can be designed so as to quickly and easily interconnect with each other as part of the overall mechanism assembly process and do not require additional assembly components such as bolts nor do the multiple elements require additional assembly procedures such as welding for example, although such components or procedures can be used. Further, the present method retains the simplicity of a mechanical solution versus an electronic circuit. Further still, the present invention avoids the circular bending encountered with bimetallic arms and the costs associated with adding such extra elements.

In the various drawings, similar and/or identical basic elements are identified with similar base numerals and with base numerals having different alphabetic notations annotated thereto. The description of the basic elements throughout the various drawings and views are applicable to all figures, configurations, and combinations of elements, unless otherwise specifically noted.

Figure 1:
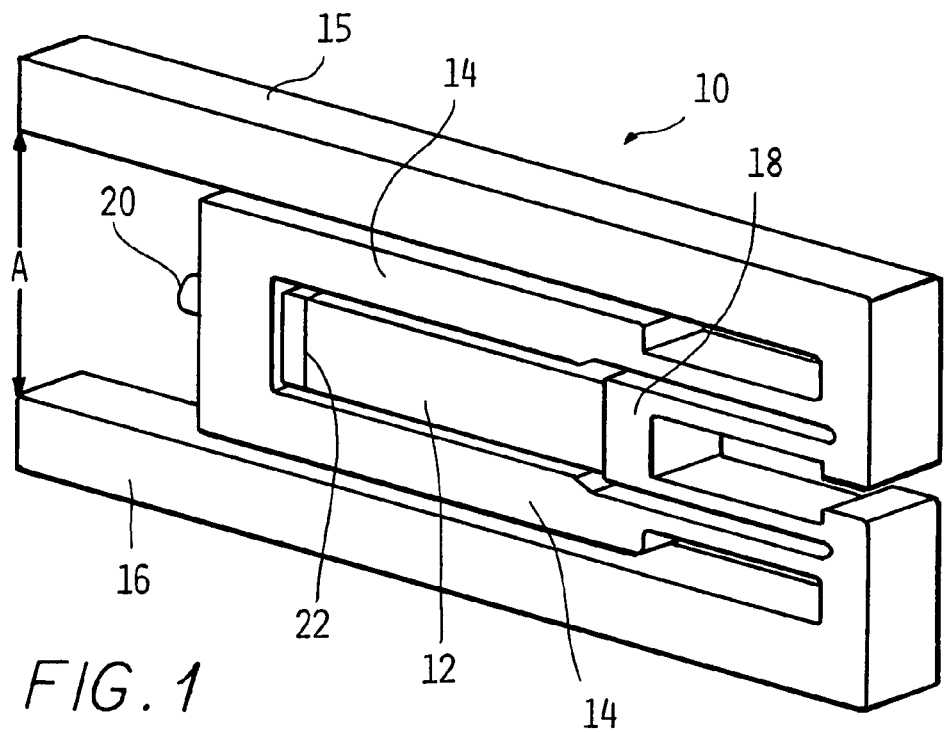
FIG. 1 is a perspective view of an electro-mechanical actuator based on CMA actuation and mechanical motion amplification with temperature compensation for differences in the CTE of the materials.

Referring now to FIG. 1, a perspective view of a single piece support and actuator apparatus 10 according to the present invention with thermal compensation applied at the actuator seat 22, or applied homogeneously or non-homogeneously as a combination of materials mixed within the feed stream or within the molds used to form the monolithic support. By way of example and not limitation, the support can be formed by any suitable method known to those skilled in the art, such as by sintering or liquid metal injection molding. A piezoelectric CMA 12 can be contained or supported within a rigid, non-flexing, support structure 14. In the present invention, the support structure 14 of the apparatus 10 can be made from one homogeneous or non-homogeneous material, by way of example and not limitation a type of steel, except for the piezoelectric CMA element 12. The output from the piezoelectric CMA 12 can be transferred to the operating arms 15 and 16 through the force transfer structure 18. A compressive preload force can be applied to the piezoelectric CMA 12 by means of an adjustable loading device 20 associated with either the support 14a and/or the force transfer member 18, and a support plate 22 associated with the actuator 12. The support plate 22 can have a higher value for the CTE than the value for the CTE of the CMA 12 in order to compensate for the lower value of CTE of the actuator 12 compared with the value of the CTE of the support 14. Nominal free deflection at the end of the operating arms 15 and 16, as indicated between arrows A, for an embodiment of this type with a width of 7.5 mm can be on the order of 2 mm, for example. Movement in a non-temperature compensated apparatus of similar configuration and structure to apparatus 10 due to thermal excursions from approximately −20° C. to approximately 60° C. can be in the order of 15% of the full nominal deflection which is undesirable for many applications.

Figure 2:
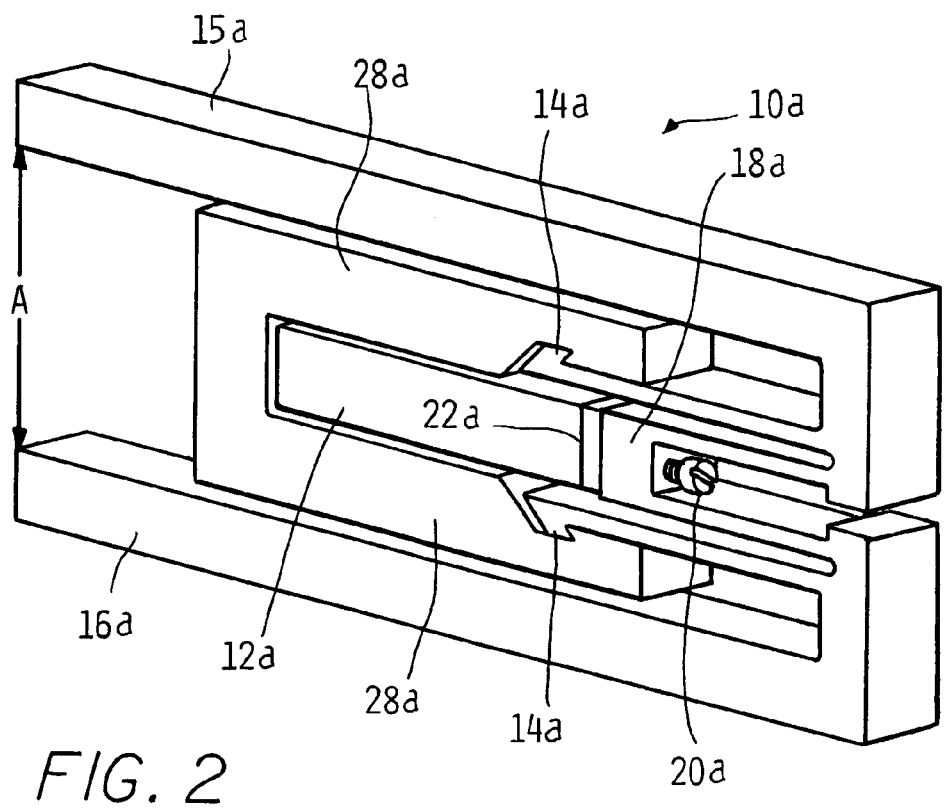
FIG. 2 is a perspective view of an electro-mechanical actuator based on CMA actuation and mechanical motion amplification with temperature compensation for differences in the CTE of the materials.

Referring now to FIG. 2, a perspective view of a thermally compensated actuator apparatus 10a according to the present invention is illustrated. A piezoelectric CMA 12a can be contained or supported within a rigid, non-flexing, support structure 14a, 28a. In the present invention, the support structure of the apparatus 10a can be made from one or more elements, by way of example and not limitation, such as a type of steel. The output from the piezoelectric CMA 12a can be transferred to the operating arms 15a and 16a through the force transfer structure 18a. A compressive preload force can be applied to the piezoelectric CMA 12a by means of an adjustable loading device 20a associated with either the rigid support portion 28a and/or the force transfer structure 18a, and a support plate 22a associated with the actuator 12a. The support plate 22a can also optionally have a higher value for the CTE than the value for the CTE of the CMA 12a in order to compensate for the lower value of CTE of the actuator 12a compared with the value of the CTE of the support 14a. In FIG. 2, part of the material of the rigid, non-flexing, support structure 14 (from the structure shown in FIG. 1) has been replaced with an element 28a made from a material with a coefficient of thermal expansion capable of compensating for the movement at the operating arms 15a and 16a caused by the thermal expansion mismatch between the materials of the support structure 14a and the piezoelectric CMA 12a. In this way the deflection at the arms can be controlled very accurately over a broad operating temperature range that, for instance, is typical of industrial type applications. Further, the means of calculating the length of the element 28a to ensure the correct amount of thermal compensation can be controlled in relation to the overall design operation requirement of the actuator apparatus according to the present invention. Further the design of the profile of the joint configuration used for the means of achieving the interconnection between the two elements 14a and 28a can minimize any of the stresses arising in the interconnection zone when the compressive preload is applied to the CMA and during operation of the invention. Additionally, the interconnection between the two mechanical elements, the support structure 14a and the compensation structure 28a, can be simple and yet can maintain the secure and rigid relationship between the two or more elements fundamental for the efficient operation of the invention without requiring additional fastening means or methods. By means of illustration, an actuator 12a using the thermal compensation method shown in FIG. 2 and of similar overall dimensions to the previously described, uncompensated, actuator can now have a thermally induced movement controlled to a level of less than 1% of the nominal actuator stroke.

Figure 3:
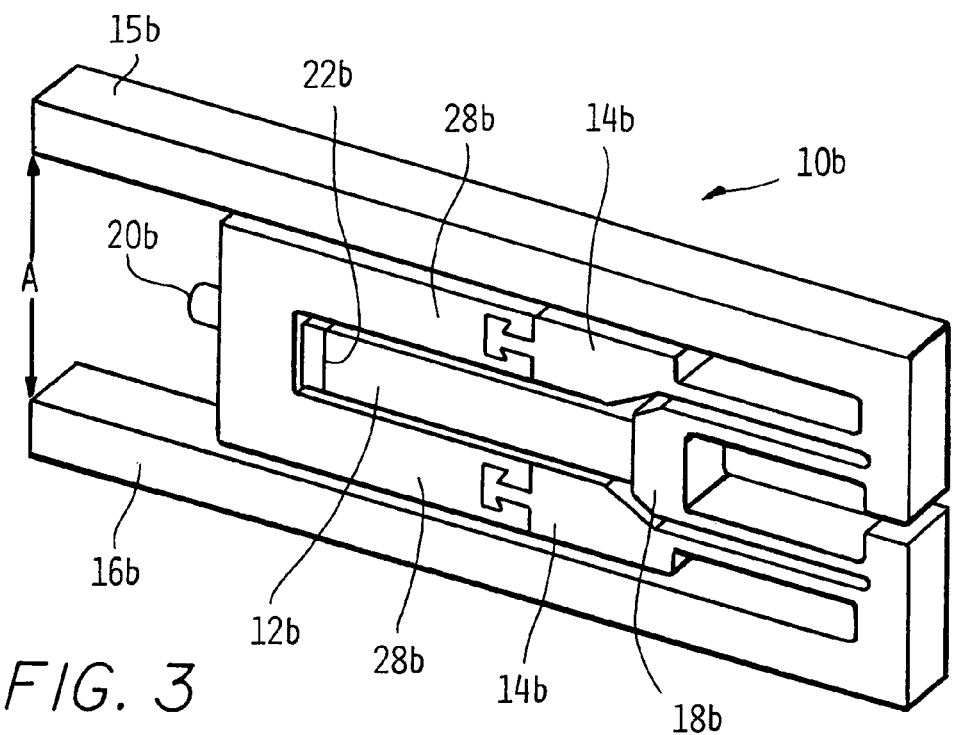
FIG. 3 is a perspective view of the electro-mechanical actuator including a thermal compensation element incorporated into the rigid support structure of the amplification mechanism.

Referring now to FIG. 3, a perspective view of a thermally compensated actuator apparatus 10b according to the present invention is illustrated. In the present invention, the support structure of the apparatus 10b can be made from one or more elements, by way of example and not limitation, such as a type of steel. The output from the piezoelectric CMA 12b can be transferred to the operating arms 15b and 16b through the force transfer structure 18b. A compressive preload force can be applied to the piezoelectric CMA 12b by means of an adjustable loading device 20b associated with the either the rigid support portion 28b and/or the rigid force transfer structure 18b, and a support plate 22b associated with the actuator 12b. The support plate 22b can also optionally have a higher value for the CTE than the value for the CTE of the CMA 12b in order to compensate for the lower value of CTE of the actuator 12b compared with the value of the CTE of the support 14b. In FIG. 3, part of the material of the rigid, non-flexing, support structure 14 (from the structure shown in FIG. 1) has been replaced with an element 28b made from a material with a coefficient of thermal expansion capable of compensating for the movement at the operating arms 15b and 16b caused by the thermal expansion mismatch between the materials of the support structure 14b and the piezoelectric CMA 12b. In this way the deflection at the arms can be controlled very accurately over a broad operating temperature range that, for instance, is typical of industrial type applications. Further, the means of calculating the length of the element 28b to ensure the correct amount of thermal compensation can be controlled in relation to the overall design operation requirement of the actuator apparatus according to the present invention. Further the design of the profile of the joint configuration used for the means of achieving the interconnection between the two elements 14b and 28b can minimize any of the stresses arising in the interconnection zone when the compressive preload is applied to the CMA and during operation of the invention. Additionally, the interconnection between the two mechanical elements, the support structure 14b and the compensation structure 28b, can be simple and yet can maintain the secure and rigid relationship between the two or more elements fundamental for the efficient operation of the invention without requiring additional fastening means or methods. By means of illustration, an actuator using the thermal compensation method shown in FIG. 3 and of similar overall dimensions to the previously described, uncompensated, actuator can now have a thermally induced movement controlled to a level of less than 1% of the nominal actuator stroke.

Figure 4:
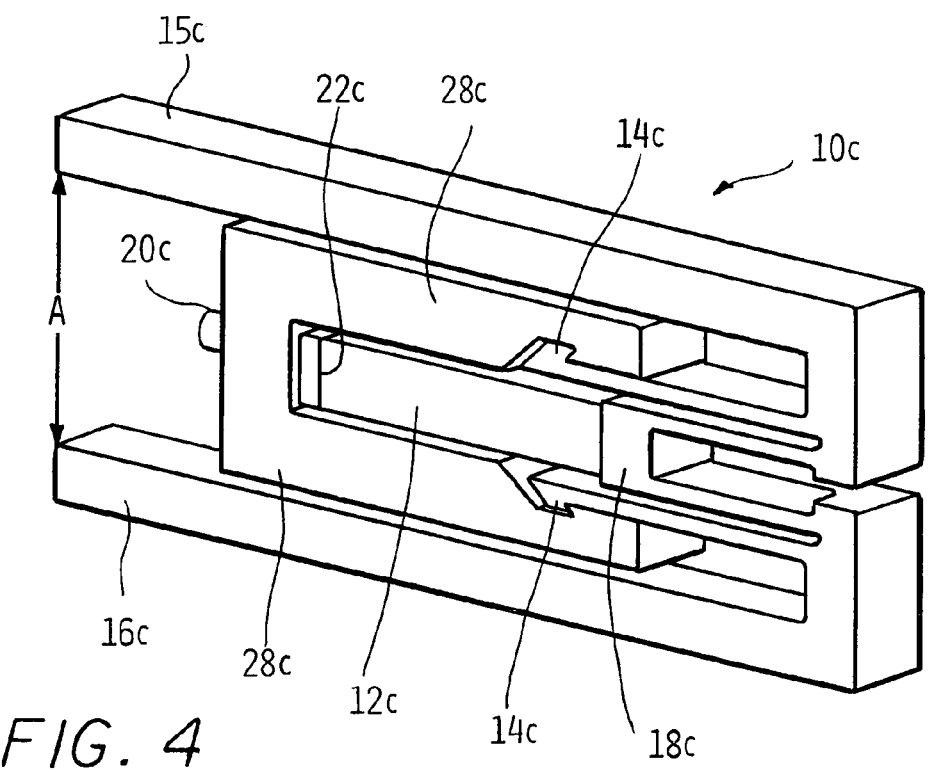
FIG. 4 is a perspective view of thermal compensation incorporated into the rigid support structure of the amplifying mechanism.

Referring now to FIG. 4, a perspective view of a thermally compensated actuator apparatus 10c according to the present invention is illustrated. In the illustrated configuration the replacement element 28c performs the thermal compensation as described with respect to FIG. 3 and can be attached to the support structure 14c using a variation of the configuration shown in FIG. 3. The present invention envisions that the interconnection of the support structure element 14c and the thermal compensating element 28c can be achieved in a variety of ways. In the present invention, the support structure of the apparatus 10c can be made from one or more elements, by way of example and not limitation, such as a type of steel. The output from the piezoelectric CMA 12c can be transferred to the operating arms 15c and 16c through the force transfer structure 18c. A compressive preload force can be applied to the piezoelectric CMA 12c by means of an adjustable loading device 20c associated with the either the rigid support portion 28c and/or the rigid force transfer structure 18c, and a support plate 22c associated with the actuator 12c. The support plate 22c can also optionally have a higher value for the CTE than the value for the CTE of the CMA 12c in order to compensate for the lower value of CTE of the actuator 12c compared with the value of the CTE of the support 14c. In FIG. 4, part of the material of the rigid, non-flexing, support structure 14 (from the structure shown in FIG. 1) has been replaced with an element 28c made from a material with a coefficient of thermal expansion capable of compensating for the movement at the operating arms 15c and 16c caused by the thermal expansion mismatch between the materials of the support structure 14c and the piezoelectric CMA 12c. In this way the deflection at the arms can be controlled very accurately over a broad operating temperature range that, for instance, is typical of industrial type applications. Further, the means of calculating the length of the element 28c to ensure the correct amount of thermal compensation can be controlled in relation to the overall design operation requirement of the actuator apparatus according to the present invention. Further the design of the profile of the joint configuration used for the means of achieving the interconnection between the two elements 14c and 28c can minimize any of the stresses arising in the interconnection zone when the compressive preload is applied to the CMA and during operation of the invention. Additionally, the interconnection between the two mechanical elements, the support structure 14c and the compensation structure 28c, can be simple and yet can maintain the secure and rigid relationship between the two or more elements fundamental for the efficient operation of the invention without requiring additional fastening means or methods. By means of illustration, an actuator using the thermal compensation method shown in FIG. 4 and of similar overall dimensions to the previously described, uncompensated, actuator can now have a thermally induced movement controlled to a level of less than 1% of the nominal actuator stroke.

Figure 5:
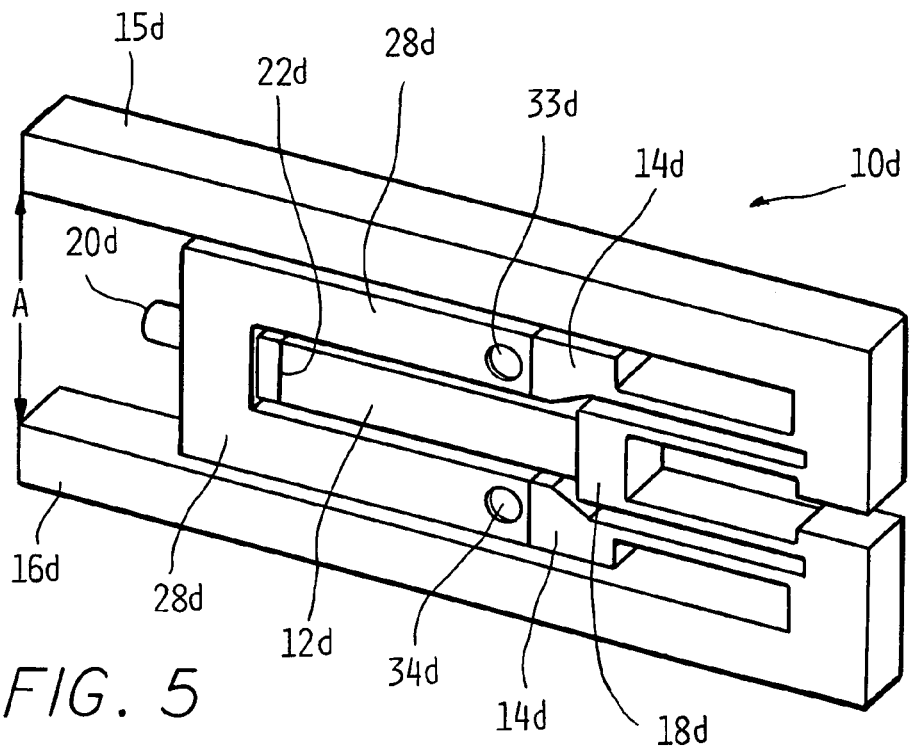
FIG. 5 is a perspective view of thermal compensation incorporated into the rigid support structure of the amplifying mechanism.

Referring now to FIG. 5, a perspective view of a thermally compensated actuator apparatus 10d is shown. An interconnection between the support structure 14d and the thermal compensating element 28d is illustrated as including two pins 33d and 34d extending through coaxially aligned apertures formed in the mating configuration surfaces. In the present invention, the support structure of the apparatus 10d can be made from one or more elements, by way of example and not limitation, such as a type of steel. The output from the piezoelectric CMA 12d can be transferred to the operating arms 15d and 16d through the force transfer structure 18d. A compressive preload force can be applied to the piezoelectric CMA 12d by means of an adjustable loading device 20d associated with the either the rigid support portion 28d and/or the rigid force transfer structure 18d, and a support plate 22d associated with the actuator 12d. The support plate 22d can also optionally have a higher value for the CTE than the value for the CTE of the CMA 12d in order to compensate for the lower value of CTE of the actuator 12d compared with the value of the CTE of the support 14d. In FIG. 5, part of the material of the rigid, non-flexing, support structure 14 (from the structure shown in FIG. 1) has been replaced with an element 28d made from a material with a coefficient of thermal expansion capable of compensating for the movement at the operating arms 15d and 16d caused by the thermal expansion mismatch between the materials of the support structure 14d and the piezoelectric CMA 12d. In this way the deflection at the arms can be controlled very accurately over a broad operating temperature range that, for instance, is typical of industrial type applications. Further, the means of calculating the length of the element 28d to ensure the correct amount of thermal compensation can be controlled in relation to the overall design operation requirement of the actuator apparatus according to the present invention. Further the design of the profile of the joint configuration used for the means of achieving the interconnection between the two elements 14d and 28d can minimize any of the stresses arising in the interconnection zone when the compressive preload is applied to the CMA and during operation of the invention. Additionally, the interconnection between the two mechanical elements, the support structure 14d and the compensation structure 28d, can be simple and yet can maintain the secure and rigid relationship between the two or more elements fundamental for the efficient operation of the invention with simple fastening means or methods. By means of illustration, an actuator using the thermal compensation method shown in FIG. 5 and of similar overall dimensions to the previously described, uncompensated, actuator can now have a thermally induced movement controlled to a level of less than 1% of the nominal actuator stroke.

Figure 6:
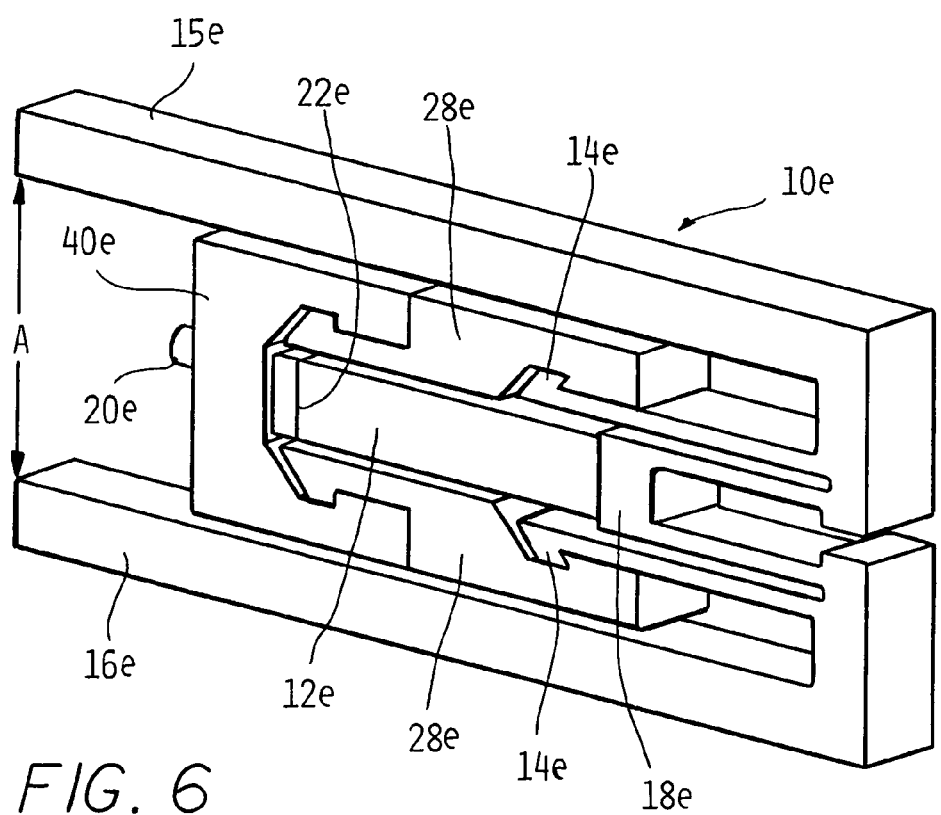
FIG. 6 is a perspective view of thermal compensation incorporated into the rigid support structure of the amplifying mechanism.

Referring now to FIG. 6, a perspective view of a thermally compensated actuator apparatus 10e according to the present invention is illustrated. In the illustrated configuration the replacement element 28e performs the thermal compensation as described with respect to FIG. 3 and can be attached to the support structure 14e using a variation of the configuration shown in FIG. 3. The present invention envisions that the interconnection of the support structure element 14e and the thermal compensating element 28e can be achieved in a variety of ways. In the present invention, the support structure of the apparatus 10e can be made from one or more elements, by way of example and not limitation, such as a type of steel. The output from the piezoelectric CMA 12e can be transferred to the operating arms 15e and 16e through the force transfer structure 18e. A compressive preload force can be applied to the piezoelectric CMA 12e by means of an adjustable loading device 20e associated with the either the rigid support portion 40e and/or the rigid force transfer structure 18e, and a support plate 22e associated with the actuator 12e. The support plate 22e can also optionally have a higher value for the CTE than the value for the CTE of the CMA 12e in order to compensate for the lower value of CTE of the actuator 12e compared with the value of the CTE of the support 14e. In FIG. 6, part of the material of the rigid, non-flexing, support structure 14 (from the structure shown in FIG. 1) has been replaced with an element 28e made from a material with a coefficient of thermal expansion capable of compensating for the movement at the operating arms 15e and 16e caused by the thermal expansion mismatch between the materials of the support structure 14e, 40e and the piezoelectric CMA 12e. The rigid support portion 40e can be formed of a material similar to the rigid portion 14e or can be a higher CTE material than the rigid portion 14e, since the compensation for the thermal expansion mismatch can occur in rigid support portion 28e and/or actuator seat plate 22e. In this way the deflection at the arms can be controlled very accurately over a broad operating temperature range that, for instance, is typical of industrial type applications. Further, the means of calculating the length of the element 28e to ensure the correct amount of thermal compensation can be controlled in relation to the overall design operation requirement of the actuator apparatus according to the present invention. Further the design of the profile of the joint configuration used for the means of achieving the interconnection between the elements 14e, 40e, and 28e can minimize any of the stresses arising in the interconnection zone when the compressive preload is applied to the CMA and during operation of the invention. Additionally, the interconnection between the mechanical elements, the support structure 14e, 40e, and the compensation structure 28e, can be simple and yet can maintain the secure and rigid relationship between the two or more elements fundamental for the efficient operation of the invention without requiring additional fastening means or methods. By means of illustration, an actuator using the thermal compensation method shown in FIG. 6 and of similar overall dimensions to the previously described, uncompensated, actuator can now have a thermally induced movement controlled to a level of less than 1% of the nominal actuator stroke.

Figure 7:
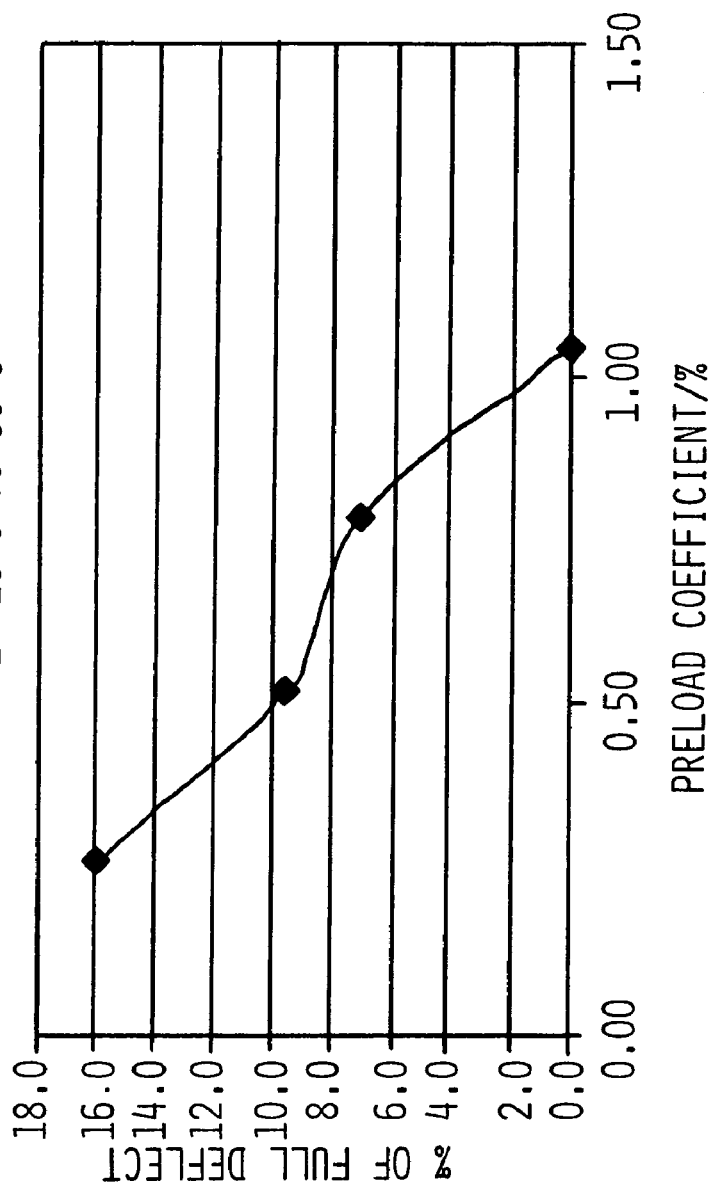
FIG. 7 illustrates compressive preload force, applied to the piezoelectric CMA in the amplifying mechanism, versus the amount of deflection due to thermal expansion mismatch between the CMA and the amplification mechanism.

Referring now to FIG. 7, a curve can illustrate the influence of CMA preload on the deflection of the amplifying mechanism caused by thermal excursions alone. FIG. 7 shows a typical adjustment that can be accomplished, over the temperature excursion of between −20 Celsius and +60 Celsius, with one particular CMA product and one particular amplifying mechanism according to the current invention by adjusting the compressive preload force applied to the CMA. The data reported in FIG. 7 used an amplifying mechanism similar to that illustrated in FIG. 3. The support structure 14b, the force transfer mechanism 18b and the operating arms 15b and 16b were made from a 17/4 grade of stainless steel. The thermal compensating element 28b was made from an Invar 36 alloy. The degree of thermal compensation is reported as percentage of full deflection which is the amount of deflection of the amplifying mechanism due to the thermal excursion divided by the amount of deflection of the amplifying mechanism due to full operation of the piezoelectric CMA. The compressive preload force is expressed as a percentage of the actual blocking force of the stack used for the experiment. The range of compressive preload force applied is to illustrate the effect of using this approach as a means of adjusting the thermal compensation of the amplification mechanism and should not be take as the total range of preload force to be used in this invention. Further, FIG. 7 is not intended to demonstrate the full extent of adjustment that can be obtained using the preload force on the CMA. The concept of adjustment using preload force has been explored and demonstrated for other CMA products and design configurations according to the present invention. In the illustration depicted by FIG. 7 the amount of thermal compensating element 28b required to compensate for deflection in the amplifying mechanism due to thermal excursion would decrease with increasing preload force. In this way, the compressive preload applied to the piezoelectric CMA can be used as part of the overall process to design the amplifying mechanism with thermal compensation according to the present invention. Based on an amplifying mechanism according to the present invention then the level of preload can be selected that allows for the correct amount of thermal compensation to be applied in order to ensure that the amount of deflection in the amplifying mechanism due to a defined thermal excursion can be suitably compensated. In this way, a device that might be using the amplifying mechanism, a valve for example, can be controlled within required performance targets over the desired thermal excursion.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for amplifying movement of an actuator with a structural assembly capable of providing consistent performance characteristics while operating across a desired range of temperature conditions comprising:
   a support having a first rigid non-flexing portion with a first coefficient of thermal expansion value and a second rigid non-flexing portion with a second coefficient of thermal expansion value different from the first coefficient of thermal expansion value, the support including at least one pivotable arm portion extending from one of the rigid portions, and a force transfer member operably positionable for driving the at least one pivotable arm portion in rotational movement; and
   a piezoelectric ceramic multilayer actuator having a third coefficient of thermal expansion value different than the first and second coefficients of thermal expansion values, the actuator operably engagable between one of the rigid portions and the force transfer member to drive the force transfer member relative to the rigid portions causing the at least one pivotable arm portion to pivot in response to an electrical activation of the actuator, wherein the different coefficient of thermal expansion values of the rigid portions in combination with a structural configuration of the support substantially compensate for the third coefficient of thermal expansion value of the actuator over a desired operating range of temperature conditions.

2. The apparatus of claim 1 further comprising:
   the first rigid portion engagable with an opposite end of the actuator from the second rigid portion; and
   complementary opposing surfaces formed on the first and second rigid portions for engagement with one another during assembly of the support.

3. The apparatus of claim 2 further comprising:
the complementary opposing surfaces allowing assembly of the structure with sliding engagement in a direction nonparallel with respect to a longitudinal axis of the actuator.

4. The apparatus of claim 2 further comprising:
the complementary opposing surfaces allowing assembly of the structure with sliding engagement in a direction perpendicular to the longitudinal axis of the actuator.

5. The apparatus of claim 1 further comprising:
an adjustable seat for one longitudinal end of the actuator supported by one of the rigid portions, such that preload force applied to the actuator maintains the first and second rigid portions in an assembled position with respect to one another.

6. The apparatus of claim 1 further comprising:
at least one pair of complementary opposing surfaces located on at least one interface between the first and second rigid portions, the pair of opposing surfaces interlockable with one another to form a rigid non-flexing receptacle for operably supporting the actuator therein.

7. The apparatus of claim 1 further comprising:
at least one pair of complementary opposing surfaces located on at least one interface between the first and second rigid portions, the pair of opposing surfaces defining an aperture for receiving at least one fastener for operably connecting the first and second rigid portions with respect to one another to define a rigid non-flexing receptacle for receiving the actuator therein.

8. The apparatus of claim 1 further comprising:
at least one integral living binge portion extending between one of the rigid portions and the at least one pivotable arm portion of the support.

9. The apparatus of claim 1 further comprising:
at least one integral living hinge portion extending between the force transfer member portion and the at least one pivotable arm portion of the support.

10. The apparatus of claim 1 further comprising:
the first and second rigid non-flexing portions of the support formed of a nonhomogeneous material in a single unitary monolithic member.

11. The apparatus of claim 1 further comprising:
the first rigid portion defining a U-shaped portion substantially surrounding a perimeter of the actuator; and
the second rigid portion defining an adjustable actuator seat supported by the first rigid portion allowing application of a preload force to the actuator while simultaneously compensating for differences in coefficient of thermal expansion values between the actuator and the rigid portions over the desired operating range of temperature conditions.

12. The apparatus of claim 1 further comprising:
a third rigid portion of the support having a fourth coefficient of thermal expansion value; and
adjustable means supported by the third rigid portion for applying a preload force to the actuator while the third rigid portion simultaneously compensates for differences in coefficient of thermal expansion values between the actuator and the rigid portions over the desired operating range of temperature conditions.

13. The apparatus of claim 12, wherein the third rigid portion has a coefficient of thermal expansion value greater than the actuator.

14. The apparatus of claim 1, wherein the second coefficient of thermal expansion value is less than the first coefficient of thermal expansion value.

15. The apparatus of claim 1, wherein the coefficient of thermal expansion value of the actuator changes as a function of preload force applied thereto.

16. The apparatus of claim 1 further comprising:
adjustable means supported by one of the rigid portions for applying preload force to the actuator while the rigid portions simultaneously compensate for differences in coefficient of thermal expansion values between the actuator and the rigid portions over the desired operating range of temperature conditions.

17. An apparatus for amplifying movement of an actuator responsive to an electrical activation comprising:
a support having a first rigid non-flexing portion with a first coefficient of thermal expansion value and a second rigid non-flexing portion with a second coefficient of thermal expansion value different from the first coefficient of thermal expansion value, the support including at least one pivotable arm portion extending from one of the rigid portions, and a force transfer member operably positioned for driving the at least one pivotable arm portion in rotational movement; and
a piezoelectric ceramic multilayer actuator having a third coefficient of thermal expansion value different than the first and second coefficients of thermal expansion values, the actuator operably engagable between one of the rigid portions and the force transfer member to drive the force transfer member relative to the rigid portions causing the at least one pivotable arm portion to pivot in response to an electrical activation of the actuator, wherein the first and second coefficients of thermal expansion values of the first and second rigid non-flexing portions in combination with a structural configuration of the support substantially reduce temperature induced variations in movement of the at least one arm over a desired operating range of temperature conditions.

18. The apparatus of claim 17 further comprising:
the first rigid portion engagable with an opposite end of the actuator from the second rigid portion; and
complementary opposing surfaces formed on the first and second rigid portions for engagement with one another during assembly of the support.

19. The apparatus of claim 18 further comprising:
the complementary opposing surfaces allowing assembly of the structure with sliding engagement in a direction nonparallel with respect to a longitudinal axis of the actuator.

20. The apparatus of claim 18 further comprising:
the complementary opposing surfaces allowing assembly of the structure with sliding engagement in a direction perpendicular to the longitudinal axis of the actuator.

21. The apparatus of claim 17 further comprising:
an adjustable seat for one longitudinal end of the actuator supported by one of the rigid portions, such that preload force applied to the actuator maintains the first and second rigid portions in an assembled position with respect to one another.

22. The apparatus of claim 17 further comprising:
at least one pair of complementary opposing surfaces located on at least one interface between the first and second rigid portions, the pair of opposing surfaces interlockable with one another to form a rigid non-flexing receptacle for operably supporting the actuator therein.

23. The apparatus of claim 17 further comprising:
at least one pair of complementary opposing surfaces located on at least one interface between the first and second rigid portions, the pair of opposing surfaces defining an aperture for receiving at least one fastener for operably connecting the first and second rigid portions with respect to one another to define a rigid non-flexing receptacle for receiving the actuator therein.

24. The apparatus of claim 17 further comprising:
at least one integral living hinge portion extending between one of the rigid portions and the at least one pivotable arm portion of the support.

25. The apparatus of claim 17 further comprising:
at least one integral living hinge portion extending between the force transfer member and the at least one pivotable arm portion of the support.

26. The apparatus of claim 17 further comprising:
the first and second rigid non-flexing portions of the support formed of a nonhomogeneous material in a single unitary monolithic member.

27. The apparatus of claim 17 further comprising:
the first rigid portion defining a U-shaped portion substantially surrounding a perimeter of the actuator; and
the second rigid portion defining an adjustable actuator seat supported by the first rigid portion allowing application of a preload force to the actuator while simultaneously compensating for differences in coefficient of thermal expansion values between the actuator and the rigid portions over the desired operating range of temperature conditions.

28. The apparatus of claim 17 further comprising:
a third rigid portion of the support having a fourth coefficient of thermal expansion value; and
adjustable means supported by the third rigid portion for applying a preload force to the actuator while the third rigid portion simultaneously compensates for differences in coefficient of thermal expansion values between the actuator and the rigid portions over the desired operating range of temperature conditions.

29. The apparatus of claim 28, wherein the third rigid portion has a coefficient of thermal expansion value greater than the actuator.

30. The apparatus of claim 17, wherein the second coefficient of thermal expansion value is less than the first coefficient of thermal expansion value.

31. The apparatus of claim 17, wherein the coefficient of thermal expansion value of the actuator changes as a function of preload force applied thereto.

32. The apparatus of claim 17 further comprising:
adjustable means supported by one of the rigid portions for applying a preload force to the actuator while the rigid portions simultaneously compensate for differences in coefficient of thermal expansion values between the actuator and the rigid portions over the desired operating range of temperature conditions.

33. A method for assembling an amplification structure for an actuator capable of providing consistent performance characteristics while operating across a desired range of temperature conditions comprising the steps of:
providing a support having a first rigid non-flexing portion with a first coefficient of thermal expansion value and a second rigid non-flexing portion with a second coefficient of thermal expansion value different from the first coefficient of thermal expansion value, the support including at least one pivotable arm portion extending from one of the rigid portions, and a force transfer member operably positionable for driving the at least one pivotable arm portion in rotational movement; and
assembling a piezoelectric ceramic multilayer actuator having a third coefficient of thermal expansion value different than the first and second coefficients of thermal expansion values between one of the rigid non-flexing portions and the force transfer member to drive the force transfer member relative to the rigid portions causing the at least one pivotable arm portion to pivot in response to an electrical activation of the actuator, wherein the first and second coefficients of thermal expansion values of the first and second rigid non-flexing portions in combination with a structural configuration of the support substantially compensate for differences in values with respect to the third coefficient of thermal expansion value of the actuator over a desired operating range of temperature conditions.

34. The method of claim 33 further comprising the steps of:
engaging the first rigid portion with an opposite end of the actuator from the second rigid portion; and
engaging complementary opposing surfaces formed on the first and second rigid portions with one another during assembly of the support.

35. The method of claim 34 further comprising the step of:
assembling the complementary opposing surfaces of the structure with sliding engagement in a direction non-parallel with respect to a longitudinal axis of the actuator.

36. The method of claim 34 further comprising the step of:
assembling the complementary opposing surfaces of the structure with sliding engagement in a direction perpendicular to the longitudinal axis of the actuator.

37. The method of claim 33 further comprising the steps of:
supporting an adjustable seat for one longitudinal end of the actuator with one of the rigid portions; and
maintaining the first and second rigid portions in an assembled position with respect to one another with preload force applied to the actuator through the adjustable seat.

38. The method of claim 33 further comprising the step of:
interlocking at least one pair of complementary opposing surfaces located on at least one interface between the first and second rigid portions with one another to form a rigid non-flexing receptacle for operably supporting the actuator therein.

39. The method of claim 33 further comprising the step of:
receiving at least one fastener with respect to at least one aperture for operably connecting the first and second rigid portions with respect to one another to define a rigid non-flexing receptacle for receiving the actuator therein, the at least one aperture defined by at least one pair of complementary opposing surfaces located on at least one interface between the first and second rigid portions.

40. The method of claim 33 further comprising the step of:
forming at least one integral living hinge portion extending between one of the rigid portions and the at least one pivotable arm portion of the support.

41. The method of claim 33 further comprising the step of:
forming at least one integral living hinge portion extending between the force transfer member portion and the at least one pivotable arm portion of the support.

42. The method of claim 33 further comprising the step of:
forming the first and second rigid non-flexing portions of the support of a nonhomogeneous material in a single unitary monolithic member.

43. The method of claim 33 further comprising the steps of:
substantially surrounding a perimeter of the actuator with the first rigid portion defining a U-shaped portion; and
allowing application of a preload force to the actuator with the second rigid portion defining an adjustable actuator seat supported by the first rigid portion while simultaneously compensating for differences in coefficient of thermal expansion values between the actuator and the rigid portions over the desired operating range of temperature conditions.

44. The method of claim 33 further comprising the steps of:
providing a third rigid portion of the support having a fourth coefficient of thermal expansion value; and
applying a preload force to the actuator with adjustable means supported by the third rigid portion while the third rigid portion simultaneously compensates for differences in coefficient of thermal expansion values between the actuator and the rigid portions over the desired operating range of temperature conditions.

45. The method of claim 44, wherein the third rigid portion has a coefficient of thermal expansion value greater than the actuator.

46. The method of claim 33, wherein the second coefficient of thermal expansion value is less than the first coefficient of thermal expansion value.

47. The method of claim 33 further comprising the step of:
applying preload force to the actuator; and
changing the coefficient of thermal expansion value of the actuator as a function of preload force applied thereto.

48. The method of claim 33 further comprising the step of:
applying a preload force to the actuator with adjustable means supported by one of the rigid portions while the rigid portions simultaneously compensate for differences in coefficient of thermal expansion values between the actuator and the rigid portions over the desired operating range of temperature conditions.

* * * * *